(12) United States Patent
Sekine et al.

(10) Patent No.: US 7,643,033 B2
(45) Date of Patent: Jan. 5, 2010

(54) MULTI-DIMENSIONAL TEXTURE MAPPING APPARATUS, METHOD AND PROGRAM

(75) Inventors: Masahiro Sekine, Yokohama (JP);
Yasunobu Yamauchi, Kawasaki (JP);
Shingo Yanagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 696 days.

(21) Appl. No.: 11/183,836

(22) Filed: Jul. 19, 2005

(65) Prior Publication Data
US 2006/0017741 A1 Jan. 26, 2006

(30) Foreign Application Priority Data
Jul. 20, 2004 (JP) .............................. 2004-212195

(51) Int. Cl.
*G09G 5/00* (2006.01)
(52) U.S. Cl. ..................................... 345/582
(58) Field of Classification Search ....................... None
See application file for complete search history.

(56) References Cited

U.S. PATENT DOCUMENTS

| | | | | |
|---|---|---|---|---|
| 5,566,284 A * | 10/1996 | Wakayama | ................... | 345/587 |
| 6,298,169 B1 * | 10/2001 | Guenter | ...................... | 382/253 |
| 7,012,615 B2 * | 3/2006 | Kraemer | ...................... | 345/582 |
| 2002/0060679 A1 * | 5/2002 | Malzbender et al. | ........ | 345/423 |
| 2004/0041816 A1 | 3/2004 | Yamauchi | | |
| 2004/0212625 A1 | 10/2004 | Sekine et al. | | |
| 2004/0252892 A1 | 12/2004 | Yamauchi et al. | | |
| 2005/0012757 A1 * | 1/2005 | Park et al. | ................... | 345/582 |

FOREIGN PATENT DOCUMENTS

JP 2003-090715 3/2003

OTHER PUBLICATIONS

Wei et al.; "Fast Texture Synthesis Using Tree-Structured Vector Quantization"; Proceedings SIGGRAPH 2000, pp. 479-488, (2000).
Ashikhmin; "Synthesizing Natural Textures"; ACM Symposium on Interactive 3D Graphics; pp. 217-226, (2001).
Liang et al.; "Real-Time Texture Synthesis by Patch-Based Sampling"; ACM Transactions on Graphics, vol. 20, No. 3, pp. 127-150, (2001).

(Continued)

*Primary Examiner*—Aaron M Richer
(74) *Attorney, Agent, or Firm*—Finnegan, Henderson, Farabow, Garrett & Dunner, L.L.P.

(57) ABSTRACT

Multi-dimensional texture mapping apparatus includes compression unit configured to compress texture image data including texture images by sampling the texture images in accordance with feature of material, the texture images acquired or created under different conditions, converter to convert the compressed texture image data into first multi-dimensional texture, the first multi-dimensional texture including a codebook and index images containing index information indicating addresses assigned to data of the codebook, the codebook storing image data extracted from same pixels in the texture images and collected, generation unit configured to generate second multi-dimensional texture of a size based on the first multi-dimensional texture, and mapping unit configured to map texture samples selected from the second multi-dimensional texture in accordance with the different conditions, based on a three-dimensional model data which specifies shape of an object mapped the texture samples.

5 Claims, 10 Drawing Sheets

OTHER PUBLICATIONS

Efros et al.; "Image Quilting for Texture Synthesis and Transfer"; SIGGRAPH 2001 Conference Proceedings, pp. 341-346, (2001).

Nealen et al.; "Hybrid Texture Synthesis"; Eurographics Symposium on Rendering, pp. 1-10, (2003).

Yamauchi, Yasuyuku et al., "Generation and Mapping of Bi-Directional Dependent Texture Using Fabric Material with Photographed Image," Visual Computing, Graphics and CAD Joint Symposium 2003, (The Institute of Image Electronics Engineers of Japan, Information Processing Society of Japan) Jun. 19, 2003 (pp. 171-176).

Notification of Reasons for Rejection, dated Jul. 1, 2008, in Japanese Application No. 2004-212195 (4 pages).

English-language translation of Notification of Reasons for Rejection, dated Jul. 1, 2008, in Japanese Application No. 2004-212195 (3 pages).

\* cited by examiner

MULTI-DIMENSIONAL TEXTURE MAPPING APPARATUS, METHOD AND PROGRAM

CROSS-REFERENCE TO RELATED APPLICATIONS

This application is based upon and claims the benefit of priority from prior Japanese Patent Application No. 2004-212195, filed Jul. 20, 2004, the entire contents of which are incorporated herein by reference.

BACKGROUND OF THE INVENTION

1. Field of the Invention

The present invention relates to a multi-dimensional texture mapping apparatus, method and program for realizing a high-quality texture mapping technique in the field of three-dimensional computer graphics. For example, it relates to a multi-dimensional texture mapping apparatus, method and program for acquiring texture that varies in accordance with conditions, such as a viewing direction and a direction of a light source, for generating textures of arbitrary sizes corresponding to such conditions, and for mapping texture on a three-dimensional model.

2. Description of the Related Art

Recently, to provide an observer with an image that gives a natural impression, a scheme for generating a texture image of an arbitrary size from a small texture image has been proposed (see Li-Yi Wei, Marc Levoy, "Fast texture Synthesis Using Tree-structured Vector Quantization", Proceedings SIGGRAPH 2000, pp. 479-488; Andrew Nealen and Marc Alexa, "Hybrid Texture Synthesis", Eurographics symposium on Rendering, 2003). In this scheme, a texture image of an arbitrary size is scanned with reference to a small original texture image, thereby generating a texture image closer to the original image. Further, another scheme as an application of the scheme has also been proposed, in which a target texture image is prepared in addition to a small reference texture image, thereby generating an image that has the same pattern or design as the target texture image and is close to the material of the small reference texture image.

However, the above conventional texture image generation technique is directed to generation of a single texture image, but not to generation and/or processing of a large number of texture images acquired in a number of viewing directions and/or using a number of light sources. As an apparatus for realizing the latter case, a multi-dimensional texture generation apparatus exists, which utilizes textures acquired or created, for example, in different viewing directions and using different light sources, and generates textures of arbitrary sizes corresponding to the respective conditions. This apparatus can generate a high-quality texture based on different conditions.

However, processing of textures acquired or created, for example, in different viewing directions using different light sources requires an enormous amount of data. Therefore, a technique for compressing texture data in accordance with the features of materials is indispensable. Data compression enables various texture generation techniques to be utilized, and enables a robust and high-quality texture to be created. In addition, when mapping a texture to a three-dimensional model, if a small number of texture samples are utilized, a highly accurate interpolation technique is necessary.

To express the optical characteristic of an object surface that varies in accordance with a viewing direction and a direction of a light source, a large number of texture images acquired in different viewing directions and in different directions of a light source, and an enormous number of computations are required. Therefore, no practical systems are established.

Moreover, since there is no texture generation method for simultaneously processing a large number of texture images, the optical characteristic of an object surface cannot be expressed in a real manner when a texture image of an arbitrary size is varied in accordance with a viewing direction and a direction of a light source.

BRIEF SUMMARY OF THE INVENTION

In accordance with an aspect of the invention, there is provided an apparatus for multi-dimensional texture mapping including: a compression unit configured to compress texture image data including a plurality of texture images by sampling the texture images in accordance with a feature of a material, the texture images acquired or created under a plurality of different conditions; a converter to convert the compressed texture image data into a first multi-dimensional texture, the first multi-dimensional texture including a codebook and index images containing index information indicating addresses assigned to data of the codebook, the codebook storing image data extracted from same pixels in the texture images and collected; a generation unit configured to generate a second multi-dimensional texture of a size based on the first multi-dimensional texture; and a mapping unit configured to map a plurality of texture samples selected from the second multi-dimensional texture in accordance with the different conditions, based on a three-dimensional model data which specifies shape of an object mapped the texture samples.

In accordance with another aspect of the invention, there is provided a method of multi-dimensional texture mapping including: performing compression of texture image data including a plurality of texture images by sampling the texture images in accordance with a feature of a material, the texture images acquired or created under a plurality of different conditions; converting the compressed texture image data into a first multi-dimensional texture, the first multi-dimensional texture including a codebook and index images containing index information indicating addresses assigned to data of the codebook, the codebook storing image data extracted from same pixels in the texture images and collected; generating a second multi-dimensional texture of a size based on the first multi-dimensional texture; and mapping a plurality of texture samples selected from the second multi-dimensional texture in accordance with the different conditions, based on a three-dimensional model data which specifies shape of an object mapped the texture samples.

In accordance with yet another aspect of the invention, there is provided a multi-dimensional texture mapping program stored in a medium which is read by a computer, the program including: means for instructing the computer to compress texture image data including a plurality of texture images by sampling the texture images in accordance with a feature of a material, the texture images acquired or created under a plurality of different conditions; means for instructing the computer to convert the compressed texture image data into a first multi-dimensional texture, the first multi-dimensional texture including a codebook and index images containing index information indicating addresses assigned to data of the codebook, the codebook storing image data extracted from same pixels in the texture images and collected; means for instructing the computer to generate a second multi-dimensional texture of a size based on the first multi-dimensional texture; and means for instructing the computer to map a plurality of texture samples selected from the second multi-dimensional texture in accordance with the different conditions, based on a three-dimensional model data which specifies shape of an object mapped the texture samples.

DETAILED DESCRIPTION OF THE INVENTION

Multi-dimensional texture mapping apparatuses, method and programs according to embodiments of the invention will be described in detail with reference to the accompanying drawings. The outline of the multi-dimensional texture mapping apparatus will firstly be described, and then the embodiments will be described.

How a three-dimensional object is seen, i.e., the shape, color, texture of the three-dimensional object, depends upon a direction (viewing direction) in which the object is viewed, and a direction (direction of a light source) in which light is radiated. In the field of three-dimensional computer graphics, the surface of a three-dimensional object is divided into a large number of two-dimensional plane sections called polygons, and image drawing is performed in units of polygons, whereby the resultant two-dimensional is used to indicate the three-dimensional object.

How a three-dimensional object is viewed when the viewing direction and the direction of a light source are changed can be expressed by changing the position (three-dimensional position) of the display polygons or the optical characteristic (e.g., brightness) of the polygons in accordance with changes in viewing direction and in the direction of the light source.

Further, to express details of each polygon, such as a design and pattern, a method called texture mapping is utilized. Texture mapping is an image-processing technique for mapping, on the surface of each polygon, an image (texture image) with a design or pattern.

First Embodiment

A multi-dimensional texture mapping apparatus 100 according to a first embodiment of the invention will be described with reference to the drawings.

Figure 1:
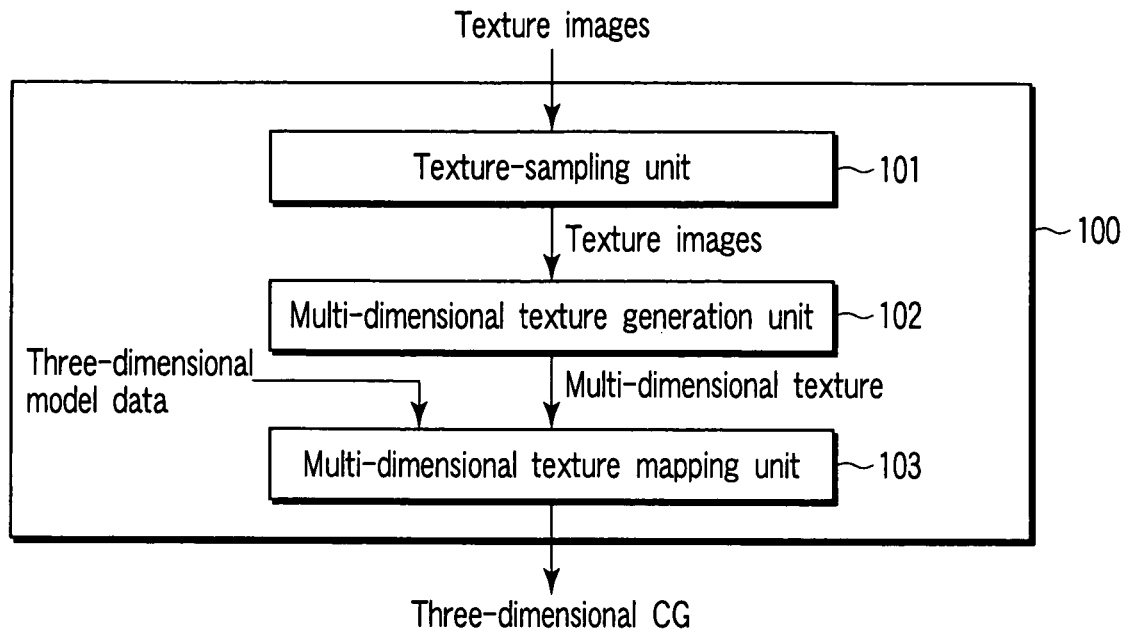
FIG. 1 is a block diagram of a multi-dimensional texture mapping apparatus according to a first embodiment of the invention.

The multi-dimensional texture mapping apparatus 100 receives texture images acquired or created under different conditions, performs texture sampling corresponding to the features of materials, generates a robust and highly qualified multi-dimensional texture, and maps the resultant texture to a three-dimensional model which specifies shape of an object mapped the texture samples. As shown in FIG. 1, the multi-dimensional texture mapping apparatus 100 comprises a texture-sampling unit 101, multi-dimensional texture generation unit 102 and multi-dimensional texture mapping unit 103.

The texture-sampling unit 101 receives a plurality of texture images acquired or created under different conditions, estimates the validity of the use of interpolation images acquired by clustering all texture images or using adjacent texture samples, and compresses the input texture images to an appropriate amount of data. Thus, the texture-sampling unit 101 reduces the number of samples (texture images) by computation of reproducibility using interpolation.

The multi-dimensional texture generation unit 102 receives the compressed texture images, extracts and collects image data of the same pixels, converts it into a data format called a multi-dimensional texture, and generates a new texture of an arbitrary size. The multi-dimensional texture generation unit 102 generates a block-base texture as a robust texture.

The multi-dimensional texture mapping unit 103 receives the three-dimensional model data and the multi-dimensional texture generated by the multi-dimensional texture generation unit 102, and performs high-quality texture mapping while performing interpolation of texture samples. By performing appropriate interpolation on a small number of texture samples, the multi-dimensional texture mapping unit 103 performs high-quality mapping.

A description will now be given of multi-dimensional texture generation by the multi-dimensional texture generation unit 102, and the data structure of a multi-dimensional texture. The multi-dimensional texture mapping apparatus 100 can be realized by the combination of optimal sampling (compression) performed by the texture-sampling unit 101, and the multi-dimensional texture generation unit 102 described below.

The multi-dimensional texture generation unit 102 generates a new multi-dimensional texture by using at least one of texture images acquired or created under different conditions. The new multi-dimensional texture is used for generating texture images of arbitrary sizes corresponding to the different conditions. The multi-dimensional texture generation unit 102 comprises a reference-multi-dimensional-texture generation unit, a reference-multi-dimensional-texture quantization unit, an index image generation unit and a new-multi-dimensional-texture generation unit. The reference-multi-dimensional-texture generation unit generates a reference multi-dimensional texture by acquiring at least one texture image as a reference texture image, and extracting and collecting color data of the pixels at the same position (the same pixels). The reference-multi-dimensional-texture quantization unit quantizes the reference multi-dimensional texture using at least one quantization level, and generates a codebook and a reference index image. In other words, the reference-multi-dimensional-texture quantization unit generates the codebook and the reference index image from the reference multi-dimensional texture by vector quantization. The index image synthesis unit synthesizes a new index image of an arbitrary size from the reference index images into which the indices of the reference texture images are converted, referring to the class of reference multi-dimensional textures corresponding to the quantization levels. The new-multi-dimensional-texture generation unit generates a new multi-dimensional texture by combining the new index image synthesized by the index image synthesis unit, and the codebook generated by the reference-multi-dimensional-texture quantization unit.

The multi-dimensional texture generation unit 102 generates a texture image of an arbitrary size and pattern by using texture images and a plurality of materials. The texture images are acquired or created in different conditions. For example, each of the different conditions differs in viewing directions, directions of light sources and brightness of the light sources.

The multi-dimensional texture generation unit 102 generates the texture images of arbitrary sizes and patterns, using the texture images formed under different conditions and including a texture image indicating at least one material. After that, the unit 102 generates a multi-dimensional texture that includes a codebook and an index image. The unit 102 generates the multi-dimensional texture by acquiring and collecting image data of the same pixels into multi-dimensional pixel data (codebook). The index image is formed of index information designating addresses assigned to the data of the codebook.

The multi-dimensional texture mapping apparatus 100 may include, as well as the multi-dimensional texture generation unit 102, a multi-dimensional texture data accumulation unit, index image synthesis unit and texture image generation unit, which are not shown in figure, and generate a texture image of an arbitrary pattern formed of a plurality of materials. The multi-dimensional texture data storage unit stores a multi-dimensional texture. The index image synthesis unit fetches, from the multi-dimensional texture data storage unit, a multi-dimensional texture formed of at least one material. The index image synthesis unit also synthesizes an index image of an arbitrary size from index images of at least one material in accordance with control data or a control image indicating the control data, which is supplied by a user, and stores the synthesized index image into the multi-dimensional texture data storage unit. The texture image generation unit fetches a multi-dimensional texture from the multi-dimensional texture data storage unit, and converts the multi-dimensional texture into at least one texture image corresponding to a particular acquisition or creation condition.

The multi-dimensional texture mapping apparatus 100 may employ a multi-dimensional texture synthesis method for synthesizing a texture image of an arbitrary size and pattern from texture images that are formed under different conditions and include a texture image indicating at least one material. This method is used to generate a texture image of an arbitrary pattern formed of a plurality of materials, and comprises the following steps.

(A) A multi-dimensional texture is generated which includes a codebook and an index image. The codebook is formed of multi-dimensional pixel data obtained by collecting image data of the same pixels acquired from texture images. The index image is formed of index information for designating addresses assigned to the data of the codebook.

(B) The multi-dimensional textures are stored into a storage unit.

(C) A multi-dimensional texture of at least one material is fetched from the storage unit, and an index image of an arbitrary size is synthesized from index images of the at least one material in accordance with control data or a control image indicating the control data, which is supplied by a user.

(D) The synthesized index image is stored into the storage unit.

(E) A multi-dimensional texture is fetched from the storage unit and converted into at least one texture image corresponding to a particular acquisition or creation condition.

The multi-dimensional texture mapping apparatus 100 may employ a computer program for enabling a computer to synthesize a texture image of an arbitrary size and pattern from texture images that are formed under different conditions and include a texture image indicating at least one material. The computer includes a processor, a memory and a storage unit. The computer program is loaded on the memory and executed by the processor. This computer program comprises the following instructions.

(A) A first instruction is to generate a multi-dimensional texture which includes a codebook and an index image. The codebook is formed of multi-dimensional pixel data obtained by collecting image data of the same pixels acquired from texture images. The index image is formed of index information for designating addresses assigned to the data of the codebook.

(B) A second instruction is to store the thus-generated multi-dimensional textures into the storage unit.

(C) A third instruction is to fetch a multi-dimensional texture of at least one material from the storage unit, and synthesize an index image of an arbitrary size from index images of the at least one material in accordance with control data or a control image indicating the control data, which is supplied by a user.

(D) A fourth instruction is to store the synthesized index image into the storage unit.

(E) A fifth instruction is to fetch a multi-dimensional texture from the storage unit and convert it into at least one texture image corresponding to a particular acquisition or creation condition.

The multi-dimensional texture mapping apparatus 100 utilizing a combination of a plurality of materials may not perform blending or filtering of multi-dimensional textures.

The multi-dimensional texture generation unit 102 includes the multi-dimensional texture storage unit (not shown) as a main unit, and can generate a multi-dimensional texture of an arbitrary pattern by combining various materials accumulated in the data accumulation unit, using control data or a control image supplied by a user. The unit 102 can reuse the generated multi-dimensional texture, and can provide a change in brightness or transmittance, or provide a special effect, such as morphing, by blending or filtering.

Figure 2:
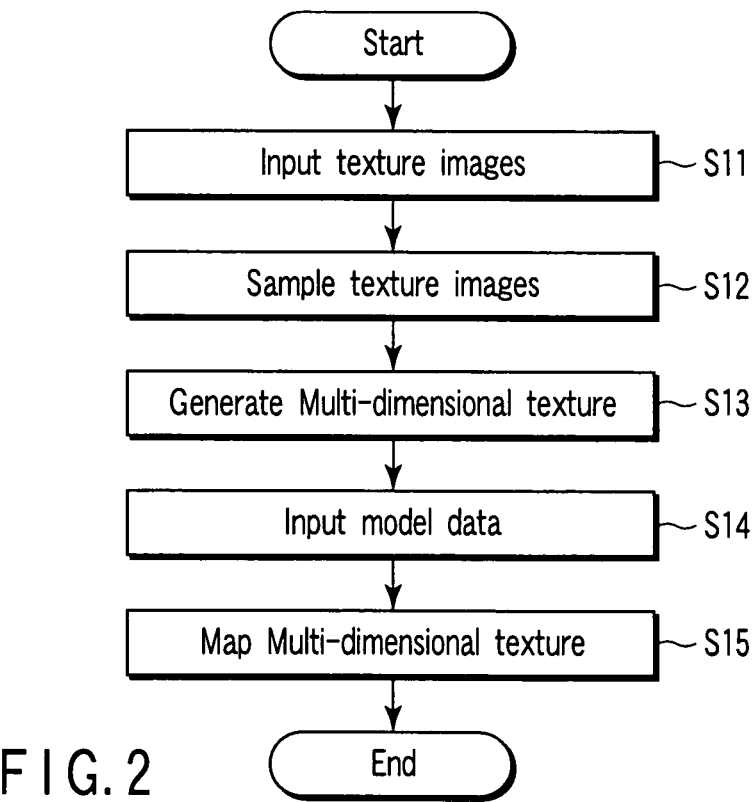
FIG. 2 is a flowchart of the multi-dimensional texture mapping apparatus of FIG. 1.

Referring to FIG. 2, the operation of the multi-dimensional texture mapping apparatus 100 of the embodiment will be described. FIG. 2 is a flowchart of operations performed by the multi-dimensional texture mapping apparatus 100 shown in FIG. 1.

The texture-sampling unit 101 receives texture images (step S11). In step S11, the texture-sampling unit 101 acquires texture images under various conditions. These conditions will be described later in detail with reference to FIGS. 3 and 4.

The texture-sampling unit 101 performs texture sampling (step S12). By this texture sampling, it is determined what a degree the texture image data should be compressed. This texture sampling will be described later in detail with reference to FIGS. 3 to 7.

The multi-dimensional texture generation unit 102 generates a multi-dimensional texture (step S13). How the multi-dimensional texture generation unit 102 generates the multi-dimensional texture will be described later with reference to FIG. 8.

The multi-dimensional texture mapping unit 103 receives three-dimensional model data (step S14), and performs multi-dimensional texture mapping (step S15). How the multi-dimensional texture mapping unit 103 receives three-dimensional model data and performs multi-dimensional texture mapping will be described later with reference to FIG. 9.

Figure 3:
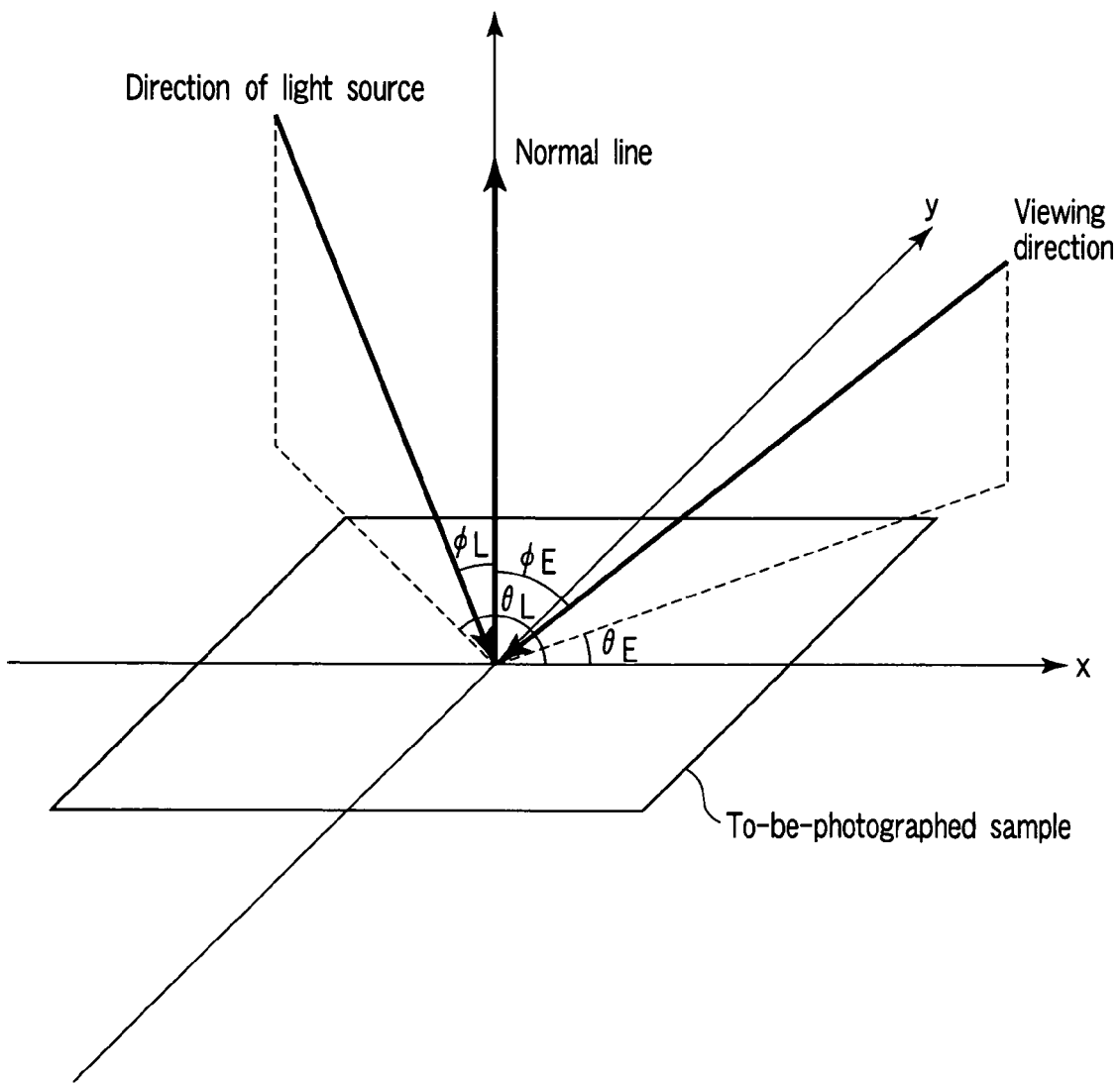
FIG. 3 is an overhead view of the $\theta\phi$ coordinate system, which is employed at step S11 in FIG. 2.
Figure 4:
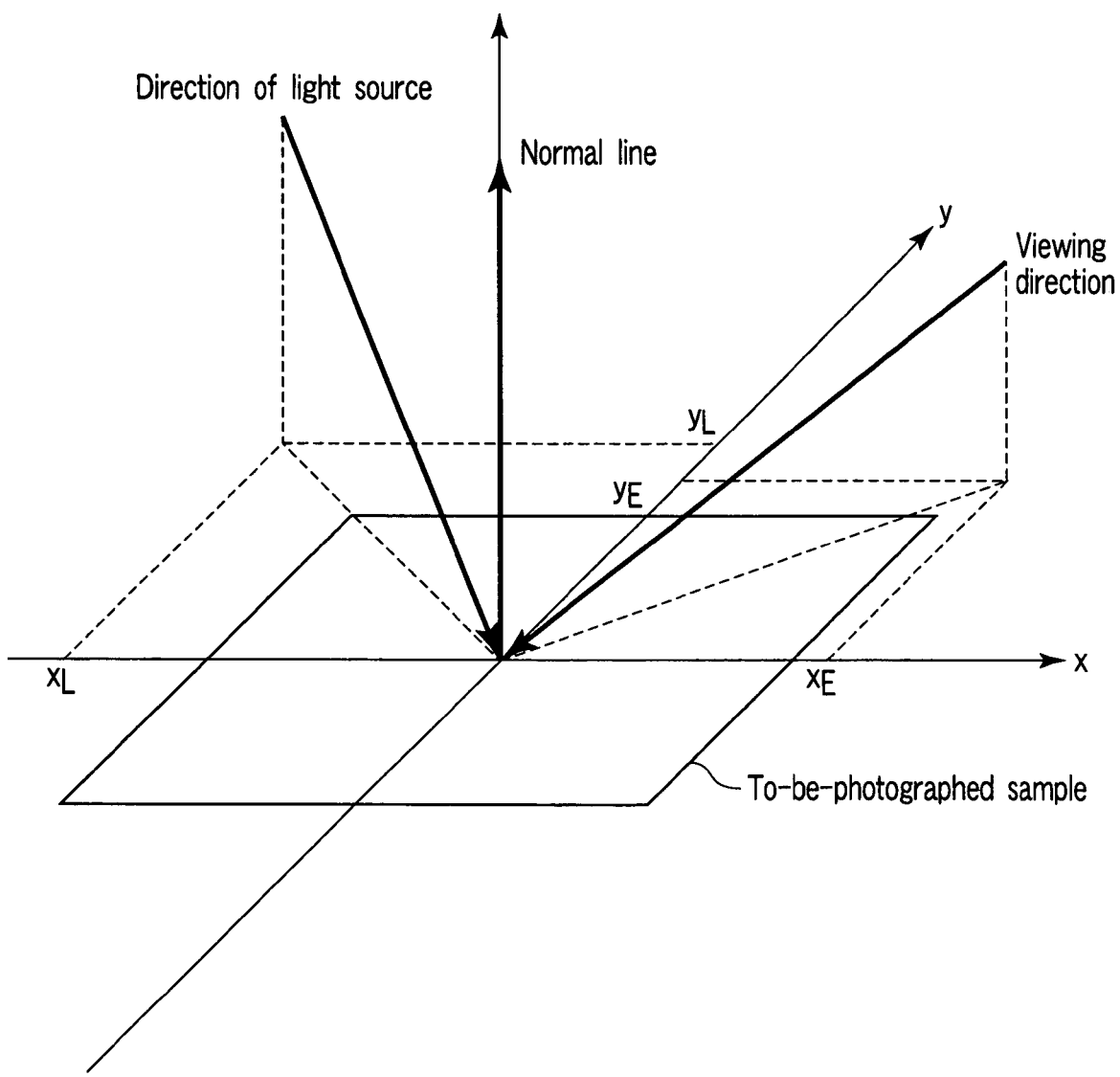
FIG. 4 is an overhead view of the XY-coordinate system, which is employed at step S11 in FIG. 2.

Referring to FIGS. 3 and 4, the conditions under which texture images are acquired at step S11 will be described. FIGS. 3 and 4 show examples of the conditions including viewing directions and directions of a light source. FIG. 3 shows a viewing direction and a direction of a light source in the θφ coordinate system, θ indicating an azimuth angle, φ indicating a zenith angle. Further, FIG. 4 shows those in the XY-coordinate system.

Figure 5:
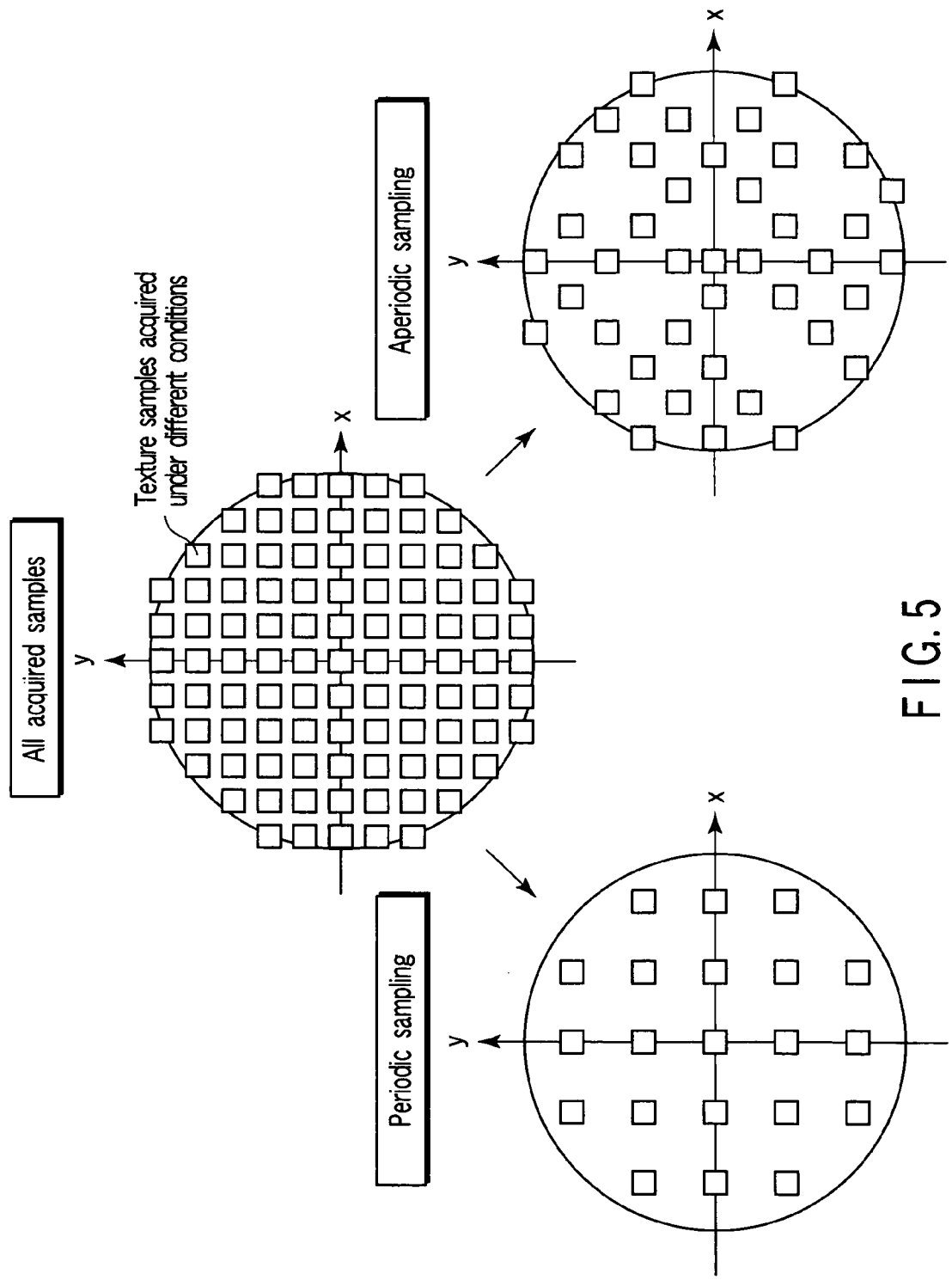
FIG. 5 shows a concept of texture sampling performed at step S12 in FIG. 2.

Referring to FIG. 5, texture sampling performed at step S12 will be described. FIG. 5 shows a basic concept for texture sampling in the texture-sampling unit 101. In general, the method shown in FIG. 3 or 4 provides a large amount of texture sample data as shown in the middle portion of FIG. 5. Specifically, if, concerning a viewing direction and a direction of a light source, sampling is performed at step S12 in units of 20 degrees (up to 360 degrees) in the θ direction and in units of 10 degrees (up to 70 degrees) in the φ direction, as many as 20,736 textures are acquired. If the texture has (256× 256×24 bit color) pixels, the total data amount is about 3.8 GB, which exceeds the amount of data that can be fast processed by the currently available computation capacity.

Therefore, to reduce the amount of data, sampling is performed periodically (sparsely). For example, if sampling is performed in units of 40 degrees in the θ direction and in units of 20 degrees in the φ direction, 1,296 textures are acquired, and their total data amount is about 243 MB. Thus, the data amount can be reduced remarkably. In addition to the above method of performing periodic sampling (periodic-sparse-sampling) to elongate the acquisition period of texture data, there is another sampling method, in which the features of texture images to be acquired are analyzed, and aperiodic sampling (aperiodic-sparse-sampling) is performed. In this aperiodic sampling, appropriate sampling corresponding to the features of materials, e.g., changes in the surfaces of the materials, can be performed.

Figure 6:
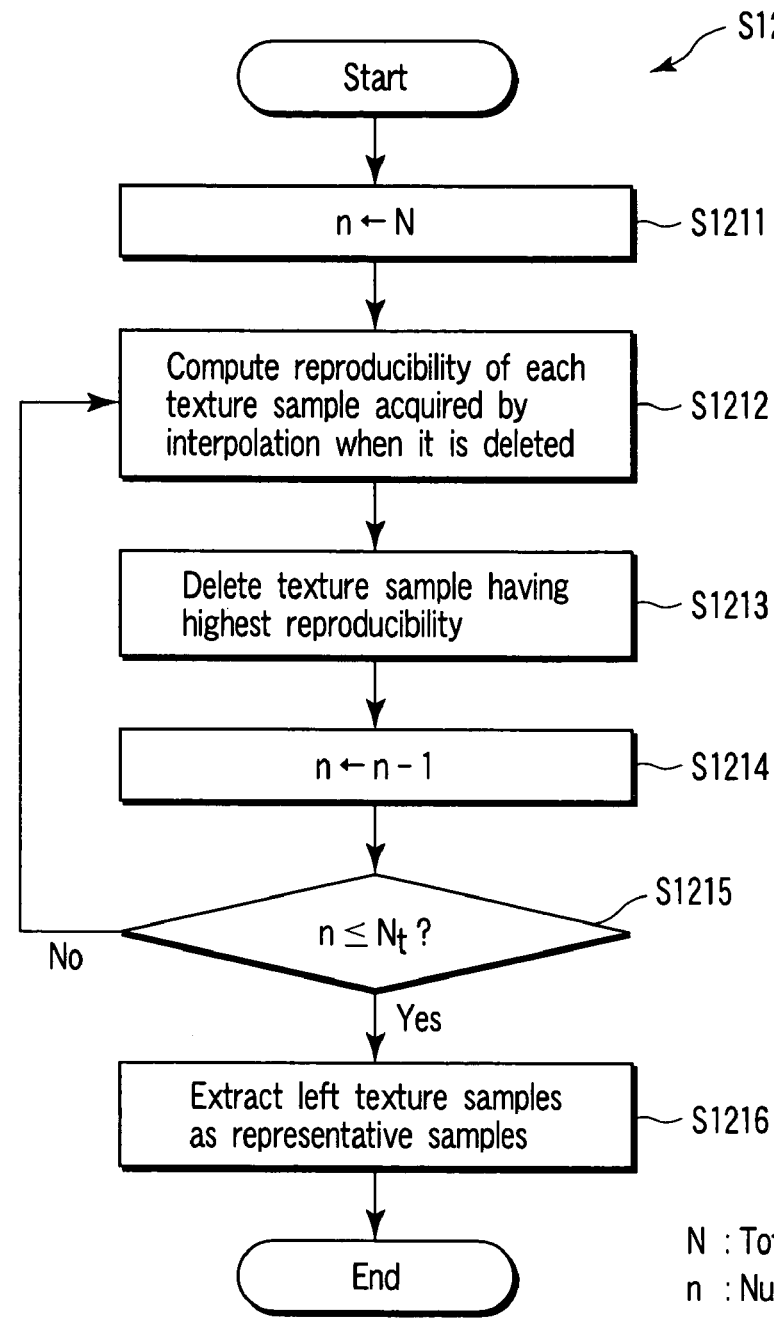
FIG. 6 is a flowchart of texture sampling performed at step S12 in FIG. 2.

Referring to FIG. 6, an example of aperiodic sampling (aperiodic-sparse-sampling) will be described. FIG. 6 is a flowchart illustrating the process performed at step S12 by the texture-sampling unit 101.

The number n is set to the total number N.

The number n is the number of current texture samples. The total number N is the number of all texture samples. (step S1211). In the process shown in FIG. 6, n is gradually reduced to a target sampling number $N_t$ (e.g., a designated sampling number allowable in the memory).

Reproducibility of each texture sample acquired by interpolation without the each texture sample is estimated (step S1212). Specifically, a plurality of texture samples acquired under similar conditions are blended, and the resultant blended image is compared to each original image. The reproducibility rises by rising of similarity between the resultant blended image and the each original image. A description will be given later of comparison of a blended image with an original image with reference to FIG. 7.

The texture sample having a highest reproducibility is deleted (step S1213). At this time, it is necessary to record which texture sample is used for interpolation to reproduce the deleted texture sample. This is because the texture samples used for interpolation may be also deleted, which adversely influences the reproducibility of the deleted texture sample.

The number n of current texture samples is reduced by 1 (step S1214), and it is determined whether n is not more than the target sampling number $N_t$ (step S1215). If n does not reach the target sampling number $N_t$, the texture-sampling unit 101 performs the processes of from step S1212 to step S1215 again, thereby repeating the processes of from step S1212 to step S1215. In contrast, if n reaches the target sampling number $N_t$, the remaining texture samples are extracted as representing samples and are output as compressed texture image data.

Figure 7:
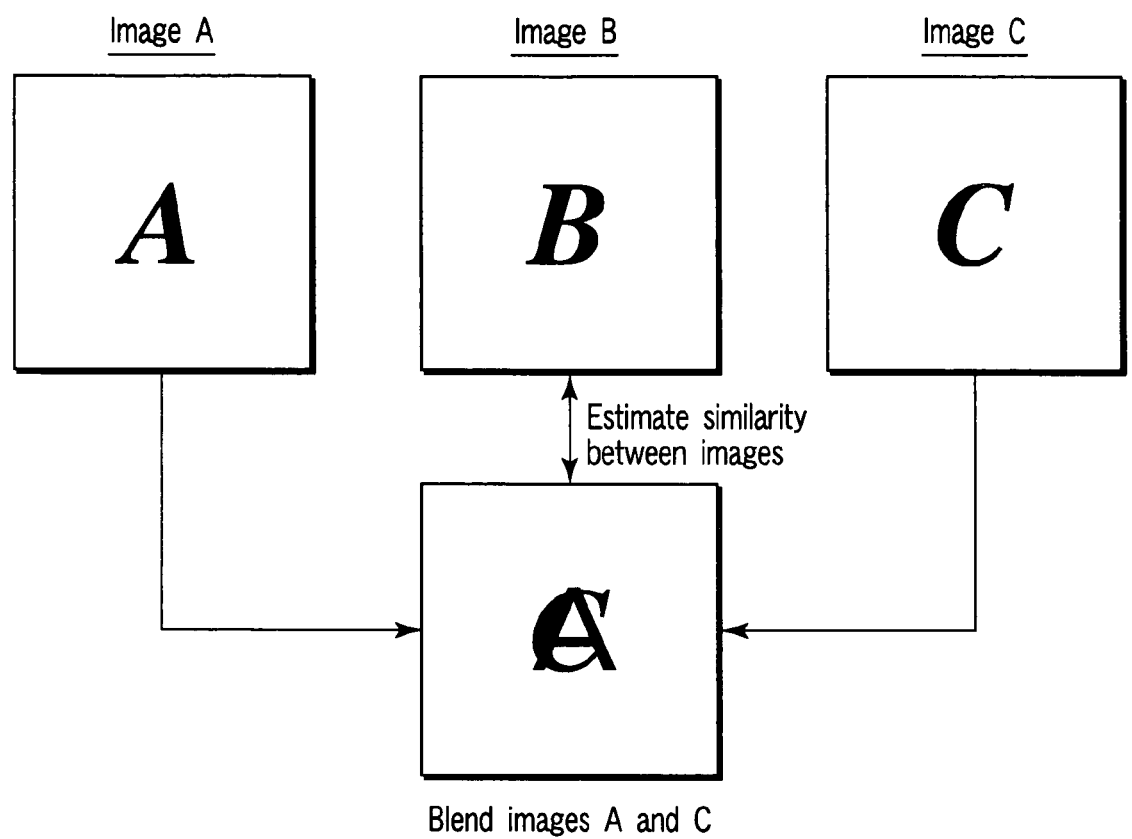
FIG. 7 shows a blended image and original image for comparison.

Referring now to FIG. 7, comparison of a blended image with an original image will be described. If images A and C exist as samples acquired under conditions similar to those for image B, images A and C are blended so that the degree of similarity of image A with respect to image B and that of image C with respect to image B can be reflected in the blended image. After that, the blended image is compared with image B. The degree of similarity between images is estimated using their S/N ratios, correlation value or dot product of vectors (e.g., each elements of vector A corresponds to each pixel of the image A).

In FIG. 6, the texture-sampling unit 101 may omit the texture-sample-deleting step S1213. In this case, the data amount cannot be reduced, but the texture samples can be arranged in decreasing order in importance. This indicates which texture samples should be regarded as important when the features of the sample materials corresponding to changes in acquisition conditions are analyzed. A texture sample having a high reproducibility by interpolation is considered not so important when the feature of its material is analyzed. In contrast, a texture sample having a low reproducibility by interpolation is considered important when the feature of its material is analyzed. In other words, high-frequency samples that exhibit remarkable material features can be extracted in preference to the other samples.

Figure 8:
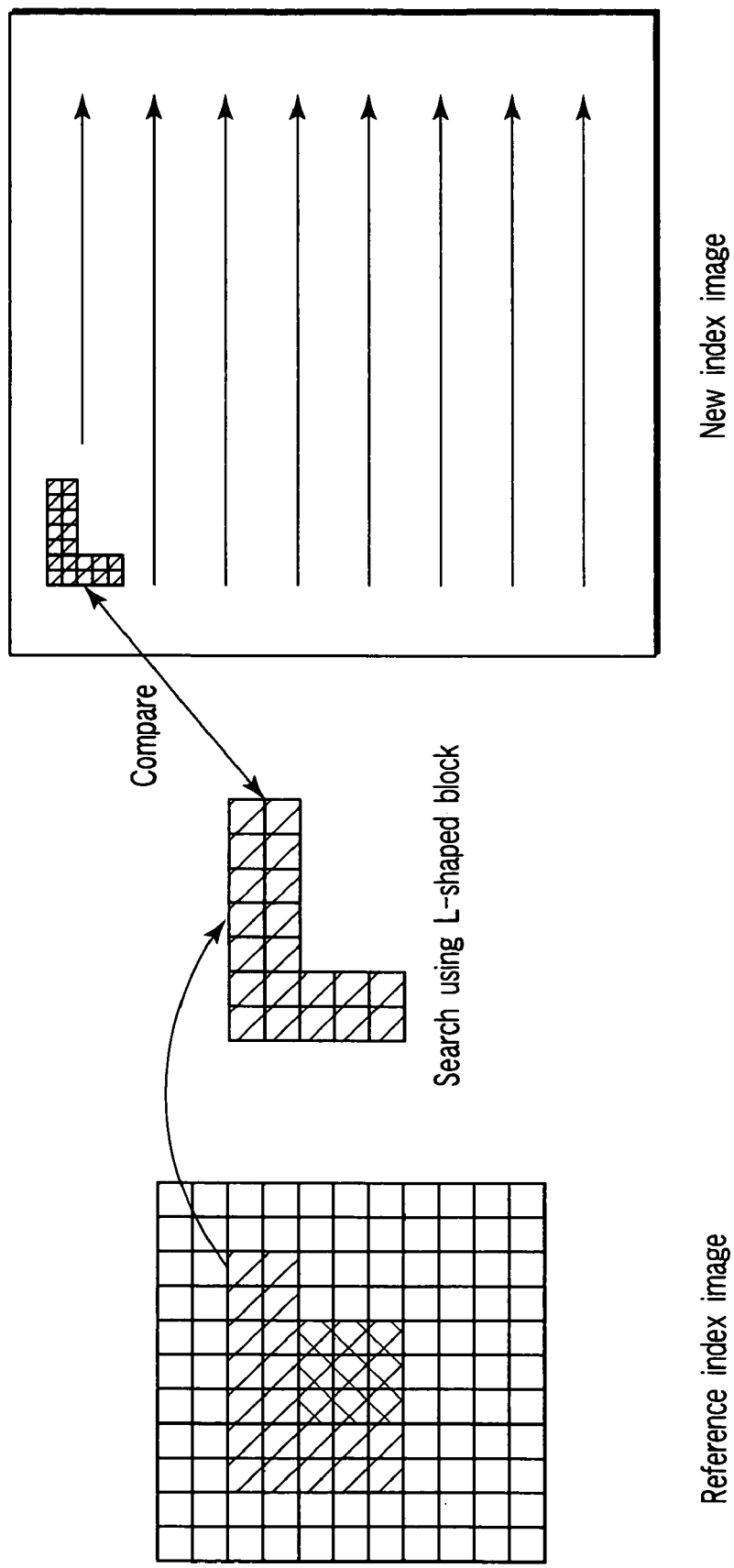
FIG. 8 is an overview of generating multi-dimensional texture by the multi-dimensional texture generation unit.

Referring to FIG. 8, a description will be given of how the multi-dimensional texture generation unit 102 generates a multi-dimensional texture.

The multi-dimensional texture generation unit 102 receives compressed texture image data, and converts it into a multi-dimensional texture, which includes a codebook and an index image. The codebook includes image data having data of pixels at the same position (the same pixels), and the data of pixels is extracted from the compressed data. The index image corresponds to index information indicating the addresses of the codebook. At this time, when non-compressed texture image data or texture image data compressed by periodic sampling are converted into a codebook, it is sufficient if image data of the same pixels are regularly arranged. However, when texture image data compressed by aperiodic sampling is converted into a codebook, the multi-dimensional texture generation unit 102 obtains a table indicating the positions at which respective texture samples are acquired under different conditions. Further, when the texture samples have different degrees of importance, the multi-dimensional texture generation unit 102 assigns thereto weights corresponding to the degrees of importance.

After that, the multi-dimensional texture generation unit 102 uses the index image as a reference index image, and generates a new index image of an arbitrary size, which is very similar to the pixel arrangement of the reference index image. As shown in FIG. 8, the new index image is scanned in units of blocks, and blocks similar to neighbor blocks of the currently scanned block of the new index image are searched for in the reference index image, thereby determining pixel values of the neighbor blocks of the new index image. Thus, all pixel values of the new index image are determined in units of blocks.

FIG. 8 shows an example of a block search. In the example of FIG. 8, an L-shaped block is searched for. In this case, a threshold value concerning a search error may be set to dynamically change the block size. In other words, the block size is variable within a range of the search error. The range corresponds to the threshold value. Further, for a portion of the new index image, in which the pixel arrangement after the pixel value determination does not correspond to that of the reference index image, the pixel values can be re-estimated in units of pixels. In the search of the L-shaped block, the pixel data items in the codebook, indicated by the index information, are compared with each other, and their similarity is estimated. At this time, if respective weights are assigned to samples and are considered during the estimation, a further reliable estimation can be realized.

The multi-dimensional texture mapping apparatus 100 of the first embodiment uses compressed texture data, which enables the amount of necessary data to be significantly reduced and the size of the reference index image to be increased. Accordingly, the size of the block, in which pixel values are determined by searching, can be increased, thereby enabling robust texture generation. This being so, the multi-dimensional texture mapping apparatus 100 of the first embodiment not only can perform such block-base texture generation, but also can perform multi-dimensional texture generation utilizing an existing technique for generating a texture of an arbitrary size from a single texture.

Figure 9:
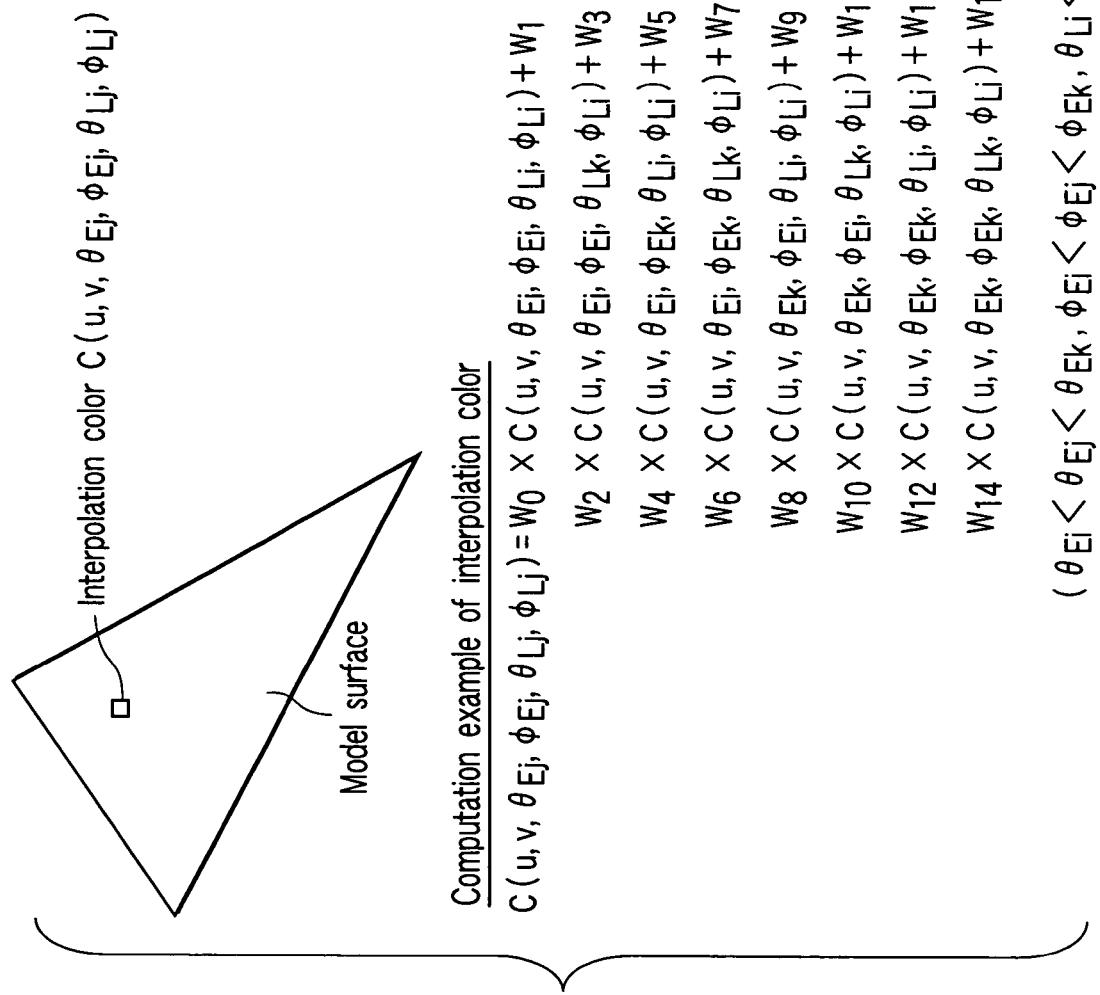
FIG. 9 is an overview of performing multi-dimensional texture mapping when the multi-dimensional texture mapping unit receives three-dimensional model data.

Referring to FIG. 9, a description will be given of how the multi-dimensional texture mapping unit 103 receives three-dimensional model data and perform multi-dimensional texture mapping.

The multi-dimensional texture mapping unit 103 receives three-dimensional model data (step S14). The multi-dimensional texture mapping unit 103 maps appropriate color data at each inner point of each triangle primitive as follows (step S15).

(A) Conditions of each point in the each triangle primitive are determined based on position of each vertex of the each triangle primitive. The conditions include, i.e., a viewing direction and a direction of a light source.

(B) Texture coordinates corresponding to each point in the each triangle primitive are calculated based on texture coordinate information for mapping at each vertex.

C (u, v, $\theta_{Ej}$, $\phi_{Ej}$, $\theta_{Lj}$, $\phi_{Lj}$) is color information condition of a certain point in a certain triangle primitive. u and v represent texture coordinates. $\theta_{Ej}$, $\phi_{Ej}$, $\theta_{Lj}$, $\phi_{Lj}$ represent acquisition conditions, i.e., the azimuth angle of a view point, the zenith angle of the view point, the azimuth angle of the light source, and the zenith angle of the light source, respectively. Since texture sample data is compressed, no texture sample that satisfies the required acquisition conditions may exist. In this case, color information at u and v of each of the texture samples acquired under conditions closer to the required acquisition conditions is blended according to weight Wk ($0 \leq k \leq 15$ in the example of FIG. 9) based on closeness to the required acquisition conditions, thereby obtaining the color information for the required acquisition conditions. Thus, even if somewhat rough texture samples are used, high-quality texture mapping can be realized by mapping interpolation colors at interpolation-needed points.

As described above, in the multi-dimensional texture mapping apparatus 100 of the first embodiment, texture images that vary in accordance with conditions, such as a viewing direction and a direction of a light source, are subjected to data compression based on the features of the materials, thereby generating a robust and high-quality texture image of an arbitrary size. Further, in the apparatus 100, highly accurate interpolation is performed in texture mapping to a three-dimensional model, whereby three-dimensional graphics with real material texture is realized.

Second Embodiment

A multi-dimensional texture mapping apparatus 100 according to a second embodiment differs from that of the first embodiment in the process performed by the texture-sampling unit 101 at step S12.

The process of step S12 of this embodiment is an example of an aperiodic sampling method. In step S12 of this embodiment, neighbor texture samples are compared with each other and sample blending is performed in the descending order of similarity to reduce the number of samples.

Figure 10:
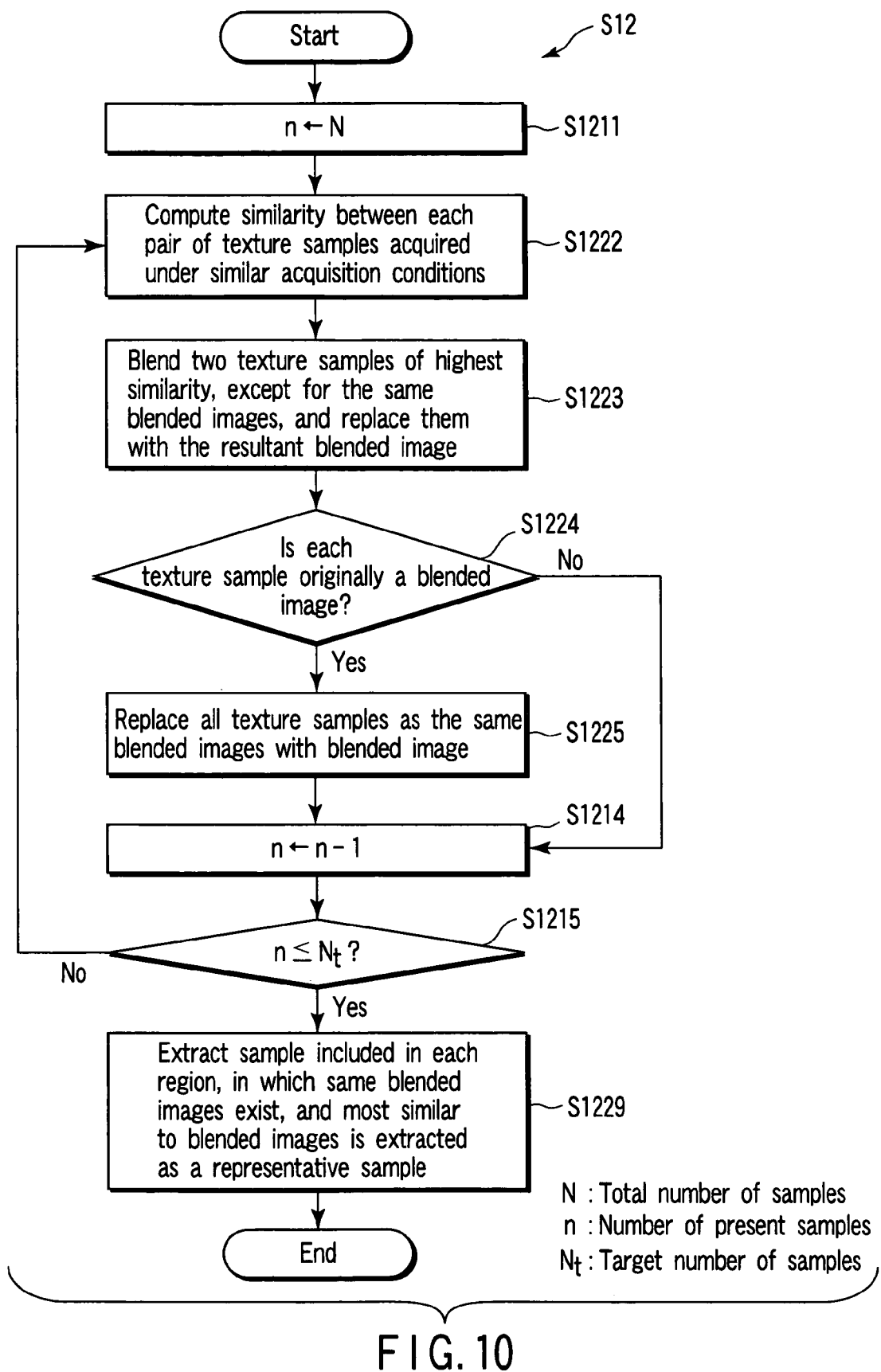
FIG. 10 is a flowchart of texture sampling performed in a second embodiment at step S12 of FIG. 2.

Referring to the flowchart of FIG. 10, the process of step S12 in this embodiment will be described. In FIGS. 6 and 10, like reference numerals denote like elements.

The number n of the current samples is set to the total number $N_t$ of samples (step S1211).

The similarity of each pair of texture samples acquired under close acquisition conditions is computed (step S1222). The similarity is evaluated based on a degree of similarity between images. The degree of similarity is estimated using their S/N ratios, correlation value or dot product of vectors.

The two texture samples of the highest similarity are blended, and the resultant blended image is used instead of the two texture samples (step S1223). In other words, the two texture samples are replaced with the blended image.

Before the texture samples are replaced with the blended image, it is determined whether each of these texture samples is a blended image (step S1224). If each texture sample is a blended image, the texture-sampling unit 101 performs the process of step S1215, while if each texture sample is not a blended image, the texture-sampling unit 101 performs the process of step S1214.

The number n of current samples is decremented by 1 (step S1214).

It is determined whether the number n is not more than the target number $N_t$ (step S1215). If the number n does not reach the number $N_t$, the texture-sampling unit 101 performs the process of step S1222 again, thereby repeating steps S1222 to S1215. In contrast, if the number n reaches the number $N_t$, the texture-sampling unit 101 performs the process of step S1229. In step S1223 at the second time or later in the repetition from step S1222 to step S1215, the texture-sampling unit 101 selects two texture samples having a highest similarity, except for the same blended images.

All texture samples including the texture samples that are formed of the same blended images are replaced with blended images (step S1225).

After the number n of current samples reach to the target number $N_t$, each of representative samples is extracted from each region having the same blended images. The each of the representative samples is the most similar to the blended image of the each region. The representative samples are output as compressed texture data (step S1229).

The multi-dimensional texture mapping apparatus 100 of the second embodiment can provide the same advantage as the apparatus 100 of the first embodiment.

Third Embodiment

A multi-dimensional texture mapping apparatus 100 according to a third embodiment differs from that of the first or second embodiment in the process performed by the texture-sampling unit 101 at step S12. In the third embodiment, the sampling number is increased by executing step S12.

The process of step S12 of the third embodiment is an example of an aperiodic sampling method. In the process of step S12 of the third embodiment, vector quantization generally called an LBG method is performed to increase the number of clusters until a target sampling number is reached.

Figure 11:
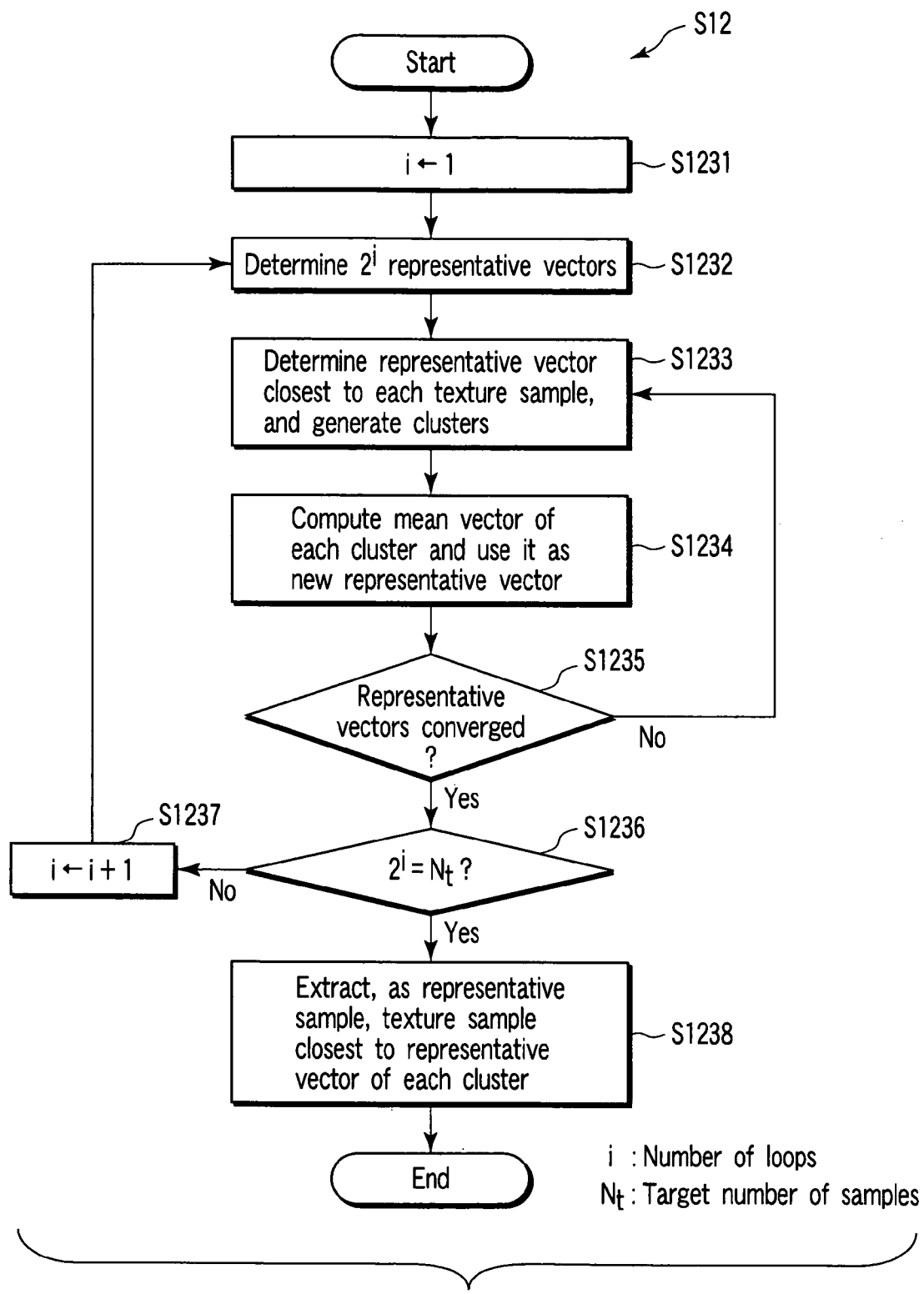
FIG. 11 is a flowchart of texture sampling performed in a third embodiment at step S12 of FIG. 2.

Referring to the flowchart of FIG. 11, the process performed at step S12 in the third embodiment will be described. In step S12, the number $2^i$ is made to approach the target sampling number $N_t$. The number $2^i$ is the number of representative vectors.

The number i of times the processing loop is executed is set to 1 (step S1231).

$2^i$ representative vectors (original vectors) are determined (step S1232), utilizing the mean and variance in pixel value of all texture samples in each cluster.

The texture samples are classified into the clusters according to closeness to each of representative vectors. Each of the texture samples is classified into the cluster having the closest representative vector. Closeness is evaluated based on degree of similarity estimated between each of the texture samples and each of the representative vectors. (step S1233).

The mean vector of all texture samples of each cluster is computed, and is set as a new representative vector (step S1234).

On the basis of difference between each of the new representative vectors acquired at step S1234 differs and at least one original vector, it is determined whether the new representative vectors are converged (step S1235). If they are not converged, the texture-sampling unit 101 performs the process of step S1233, whereas if they are converged, the texture-sampling unit 101 performs the process of step S1236.

It is determined whether $2^i$ reaches the target sampling number $N_t$ (step S1236).

If it does not reach the sampling number $N_t$, the texture-sampling unit 101 performs the process of step S1237. In contrast, if it reaches the sampling number $N_t$, the texture-sampling unit 101 performs the process of step S1238.

The number i is increased by 1 (step S1237). The texture-sampling unit 101 performs the process of the step S1232 again.

Texture samples closest to the representative vectors of all clusters are extracted as representative samples and output as compressed texture image data (step S1238).

The multi-dimensional texture mapping apparatus 100 of the third embodiment can provide the same advantage as the apparatus 100 of the first embodiment.

The multi-dimensional texture mapping apparatus 100 according to each embodiment may be an apparatus for accumulating multi-dimensional texture data. In this case, the multi-dimensional texture mapping unit 103 is not required. Further, the mapping apparatus 100 may perform data reproduction using the multi-dimensional texture generation unit 102. The mapping apparatus 100 as an apparatus for accumulating multi-dimensional texture data may also be used as a database on a network.

The multi-dimensional texture mapping apparatus 100 of each embodiment can utilize various texture generation techniques by virtue of texture data compression. It not only can generate a texture of an arbitrary size from a single texture, but also can easily utilize this technique as a multi-dimensional texture generation technique.

It can be expected to install the multi-dimensional texture mapping apparatus 100 of each embodiment in a next-generation graphics-processing engine, and to use it for cloth simulation in apparel business, or for interior/exterior decoration of buildings or cars.

The multi-dimensional texture mapping apparatus, method and program of the embodiment can compress an enormous amount of data, generate a robust and high-quality texture using the compressed data, and hence perform highly accurate mapping using a small number of texture samples.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer readable memory including computer executable instructions, wherein the instructions, when executed by a processor, cause the processor to perform a method comprising:

compressing texture image data including a plurality of texture images by sampling the texture images in accordance with a feature of a material, the texture images acquired or created under a plurality of different conditions;

converting the compressed texture image data into a first multi-dimensional texture, the first multi-dimensional texture including a codebook and index images containing index information indicating addresses assigned to data of the codebook, the codebook storing image data extracted from same pixels in the texture images and collected;

generating a second multi-dimensional texture of a size based on the first multi-dimensional texture; and mapping a plurality of texture samples selected from the second multi-dimensional texture in accordance with the different conditions, based on a three-dimensional model data which specifies a shape of an object to which the texture samples are mapped, wherein compressing the texture image data estimates validity of use of a plurality of interpolation images acquired by clustering the texture images or by using adjacent ones of the selected texture samples, compressing the texture image data performs periodic sampling of the texture images or aperiodic sampling thereof, and when performing the aperiodic sampling, compressing the texture image data computes reproducibility of each texture sample of the selected texture samples, acquired by interpolation if the each texture sample is deleted, deletes a texture sample included in the selected texture samples and having a highest reproducibility, repeats a process of computing the reproducibility and deleting the texture sample having the highest reproducibility until the number of the selected texture samples reaches a target number, wherein when subjecting the texture images to aperiodic sampling, compressing the texture image data computes similarity between every pair of texture samples of the selected texture samples acquired under similar ones of the different conditions, blends two texture samples included in the selected texture samples having a highest similarity, replaces, with a resultant blended image, the two texture samples having the highest similarity, and repeats a series of processing including the computing, the blending and the replacing until the number of the texture samples reaches a target number.

2. The computer readable memory according to claim 1, wherein compressing the texture image data performs the computing of the similarity except for same blended images.

3. The computer readable memory according to claim 1, wherein when compressing the texture image data replaces, with the resultant blended image, the two texture samples having the highest similarity, if at least one of the two texture samples is formed of a blended image of some of the selected texture samples, each of several texture samples included in the selected texture samples and formed of same blended image as the blended image of the several texture samples is replaced with the resultant blended image.

4. A computer readable memory including computer executable instructions, wherein the instructions, when executed by a processor, cause the processor to perform a method comprising:

compressing texture image data including a plurality of texture images by sampling the texture images in accordance with a feature of a material, the texture images acquired or created under a plurality of different conditions;

converting the compressed texture image data into a first multi-dimensional texture, the first multi-dimensional texture including a codebook and index images containing index information indicating addresses assigned to data of the codebook, the codebook storing image data extracted from same pixels in the texture images and collected;

generating a second multi-dimensional texture of a size based on the first multi-dimensional texture; and mapping a plurality of texture samples selected from the second multi-dimensional texture in accordance with the different conditions, based on a three-dimensional model data which specifies a shape of an object to which the texture samples are mapped, wherein compressing the texture image data estimates validity of use of a plurality of interpolation images acquired by clustering the texture images or by using adjacent ones of the selected texture samples, compressing the texture image data performs periodic sampling of the texture images or aperiodic sampling thereof, and when performing the aperiodic sampling, compressing the texture image data computes reproducibility of each texture sample of the selected texture samples, acquired by interpolation if the each texture sample is deleted, deletes a texture sample included in the selected texture samples and having a highest reproducibility, repeats a process of computing the reproducibility and deleting the texture sample having the highest reproducibility until the number of the selected texture samples reaches a target number, wherein compressing the texture image data determines two representative vectors using at least one of mean and variance of pixel values of the selected texture samples, acquires closest representative vectors corresponding to the selected texture samples, divides the selected texture samples into a plurality of clusters, computes a mean vector as a new representative vector corresponding to each of the clusters, repeats a series of processing including the determining, the acquiring, the dividing and the computing until new representative vectors of the clusters are converged, the number of the new representative vectors being 2k which is increased up to a certain value, k representing number of times of the series of processing.

5. A computer readable memory including computer executable instructions, wherein the instructions, when executed by a processor, cause the processor to perform a method comprising:

compressing texture image data including a plurality of texture images by sampling the texture images in accordance with a feature of a material, the texture images acquired or created under a plurality of different conditions;

converting the compressed texture image data into a first multi-dimensional texture, the first multi-dimensional texture including a codebook and index images containing index information indicating addresses assigned to data of the codebook, the codebook storing image data extracted from same pixels in the texture images and collected;

generating a second multi-dimensional texture of a size based on the first multi-dimensional texture; and mapping a plurality of texture samples selected from the second multi-dimensional texture in accordance with the different conditions, based on a three-dimensional model data which specifies a shape of an object to which the texture samples are mapped, wherein compressing the texture image data estimates validity of use of a plurality of interpolation images acquired by clustering the texture images or by using adjacent ones of the selected texture samples, compressing the texture image data performs periodic sampling of the texture images or aperiodic sampling thereof, and when performing the aperiodic sampling, compressing the texture image data computes reproducibility of each texture sample of the selected texture samples, acquired by interpolation if the each texture sample is deleted, deletes a texture sample included in the selected texture samples and having a highest reproducibility, repeats a process of computing the reproducibility and deleting the texture sample having the highest reproducibility until the number of the selected texture samples reaches a target number, wherein generating the second multi-dimensional texture generates a new index image similar in pixel arrangement to the index image, and having a size corresponding to a compression ratio of the compressed texture image data, scans the new index image in units of blocks, searches the index image for portions similar to neighboring blocks of currently scanned blocks of the new index image, determines pixel values in the neighboring blocks of the new index image based on the searched portions of the index image, generating the second multi-dimensional texture setting a threshold value for a search error when searching the index image for the portions similar to the neighboring blocks of the new index image, dynamically changing a size of each of the scanned blocks within a range of the search error in accordance with a size of the new index image, generating the second multi-dimensional texture re-determining each of the pixel values if a pixel arrangement of each of the scanned blocks in which pixel values are newly determined is different from a pixel arrangement of the index image.

* * * * *